(12) United States Patent
Kokku et al.

(10) Patent No.: US 7,944,868 B2
(45) Date of Patent: May 17, 2011

(54) METHOD AND SYSTEM FOR DYNAMIC POWER MANAGEMENT IN WIRELESS LOCAL AREA NETWORKS

(75) Inventors: Ravidranath Kokku, Monmouth Junction, NJ (US); Vishnu Navda, East Meadow, NJ (US); Samrat Ganguly, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 823 days.

(21) Appl. No.: 11/935,648

(22) Filed: Nov. 6, 2007

(65) Prior Publication Data

US 2008/0130541 A1  Jun. 5, 2008

Related U.S. Application Data

(60) Provisional application No. 60/868,416, filed on Dec. 4, 2006.

(51) Int. Cl.
*G08C 17/00* (2006.01)
*H04W 4/00* (2009.01)
*H04B 7/00* (2006.01)
*H04J 3/14* (2006.01)

(52) U.S. Cl. ........ 370/311; 370/338; 370/349; 370/350; 455/69; 455/343.4; 455/522

(58) Field of Classification Search .......... 370/311, 370/338, 349, 350; 455/69, 343.4, 522
See application file for complete search history.

(56) References Cited

U.S. PATENT DOCUMENTS

| | | | | |
|---|---|---|---|---|
| 5,530,918 | A * | 6/1996 | Jasinski | 340/7.25 |
| 6,728,550 | B1 * | 4/2004 | Bohnke et al. | 455/522 |
| 6,907,229 | B2 | 6/2005 | Shpak | |
| 6,987,738 | B2 * | 1/2006 | Subramanian et al. | 370/252 |
| 7,383,057 | B1 * | 6/2008 | Senarath et al. | 455/522 |
| 7,403,499 | B2 * | 7/2008 | Shapira | 370/328 |
| 7,627,336 | B2 * | 12/2009 | Carlsson et al. | 455/522 |
| 7,647,516 | B2 * | 1/2010 | Ranganathan et al. | 713/320 |
| 7,702,351 | B2 * | 4/2010 | Soliman | 455/522 |
| 7,756,542 | B1 * | 7/2010 | Kaiser et al. | 455/522 |
| 7,756,548 | B2 * | 7/2010 | Laroia et al. | 455/561 |
| 2003/0022686 | A1 | 1/2003 | Soomro | |
| 2004/0082356 | A1 | 4/2004 | Walton | |
| 2004/0142715 | A1 * | 7/2004 | Oses | 455/522 |
| 2005/0041605 | A1 * | 2/2005 | Benson | 370/280 |
| 2005/0197147 | A1 | 9/2005 | Stephens | |
| 2006/0120338 | A1 | 6/2006 | Hwang | |
| 2006/0193296 | A1 | 8/2006 | Zhong | |
| 2007/0002803 | A1 | 1/2007 | Destino | |
| 2007/0091853 | A1 * | 4/2007 | Carlsson et al. | 370/335 |
| 2007/0201540 | A1 * | 8/2007 | Berkman | 375/219 |
| 2007/0224936 | A1 | 9/2007 | Desai | |
| 2007/0230392 | A1 | 10/2007 | Adams | |
| 2008/0248760 | A1 * | 10/2008 | Booker et al. | 455/88 |
| 2010/0214966 | A1 * | 8/2010 | Hu et al. | 370/311 |

OTHER PUBLICATIONS

Kawadia, V. et al., "Principles and Protocols for Power Control in Wireless Ad Hoc Networks", IEEE Journal on Selected Areas in Communications, vol. 23, No. 1, Jan. 2005.

(Continued)

*Primary Examiner* — Alpus H Hsu
(74) *Attorney, Agent, or Firm* — Joseph Kolodka (57) ABSTRACT

A method and system for improving spatial reuse in a wireless local area network (WLAN) by per-client dynamic power management. Each access point of the WLAN associates each of its clients with a minimum power level. A central controller of the WLAN generates a schedule for transmission at different power levels, and each access point varies its transmission power level based on the schedule. An access point transmits data packets, at the scheduled transmission power level, to clients associated with a minimum power level that is less than the scheduled power level.

22 Claims, 7 Drawing Sheets

OTHER PUBLICATIONS

Chevillat, P. et al., "Dynamic Data Rate and Transmit Power Adjustment in IEEE 802.11 Wireless LANs", International Journal of Wireless Information Networks, vol. 12, No. 3, Jul. 2005.

Jung, E.-S. et al., "A Power Control MAC Protocol for Ad Hoc Networks", Mobicom'02, Sep. 2002.

Akella, A. et al., "Self-Management in Chaotic Wireless Deployments", Mobicom'05, Sep. 2005.

Kim, T-S et al., "Improving Spatial Reuse Through Tuning Transmit Power, Carrier Sense Threshold, and Data Rate in Multihop Wireless Networks", Mobicom'06, Sep. 2006.

Sheth, A., "SHUSH: A MAC Protocol for Transmit Power Controlled Wireless Networks", Department of Computer Science, University of Boulder, Colorado, Technical Report CU-CS-986-04, Dec. 2004.

* cited by examiner

METHOD AND SYSTEM FOR DYNAMIC POWER MANAGEMENT IN WIRELESS LOCAL AREA NETWORKS

This application claims the benefit of U.S. Provisional Application No. 60/868,416 filed Dec. 4, 2006, the disclosure of which is herein incorporated by reference.

BACKGROUND OF THE INVENTION

The present invention relates to power management in wireless local area networks (WLANs), and more particularly to a dynamic per-client power management in WLANs.

Wireless local area network (WLAN) is an important technology, for providing Internet access to users. Managed WLANs refer to deployments in which all access points (APs) are under the same administrative domain. Example of such managed WLANs include small-range corporate networks and campus networks, hot-spot networks, such as T-mobile, and city-wide networks, such as Google's Wifi, MIT's roofnet, and Houston's urban network. In order to provide maximal coverage, such networks often contain multiple APs with overlapping transmission and frequency ranges. While coverage depends on the transmission ranges of the APs, the performance of each AP depends on the inference ranges of neighboring APs. Greater overlap of interference and transmission ranges can lead to increased contention for transmission channels and increased packet collisions. As a result, in a dense deployment of APs for maximal coverage, each AP often operates at sub-optimal performance due to interference from neighboring APs, thereby reducing overall network throughput.

Conventional approaches for mitigating interference and improving spatial reuse (i.e., increasing the number of simultaneous AP-client transmissions) include using non-overlapping transmission channels for interfering APs, and tuning each AP's transmission power to an optimum level. The approach of using non-overlapping transmission channels suffers from a scarcity of non-overlapping channels in the 802.11a/b/g standard, which is commonly used for WLANs. The approach of tuning each AP's transmission power level to an optimum level requires an AP to use the same power level to transmit to all of its clients.

BRIEF SUMMARY OF THE INVENTION

The present invention is directed to a system and method that provide improved spatial reuse in a wireless local area network (WLAN) by dynamically tuning an access point's (AP) transmission power on a per-client basis. According to embodiments of the present invention, APs can transmit data packets to a client at the lowest transmission power at which the client can successfully receive the data packets.

According to one embodiment of the present invention, an AP in a WLAN services multiple clients. The AP associates each of its clients with a minimum power level. The AP transmits data packets, at each of multiple scheduled power levels, to clients associated with a minimum power level that is less than the scheduled power level. The AP can also generate refinement hints for adjusting the schedule of power levels, and upgrade the minimum power levels associated with its clients.

According to another embodiment of the present invention, a WLAN includes multiple APs, each servicing multiple clients, and a central controller. Each AP associates each of its clients with a minimum power level. The central controller generates a schedule for transmission at each of multiple transmission power levels for a corresponding transmission time. Based on the schedule, each AP transmits at each of the transmission power levels for the corresponding transmission time. Each AP transmits data packets, at the scheduled transmission power level, to clients associated with a minimum power level that is less than the scheduled power level. Each AP can transmit refinement hints to the central controller, and the central controller can refine the global schedule based on the refinement hints. Each AP can also upgrade the minimum power levels associated with its clients.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to improving spatial reuse in a wireless local area network (WLAN) by per-client dynamic power management. Embodiments of the present invention are directed to per-client dynamic power management in a managed WLAN, in which all of access points (APs) are under the same administrative control.

Figure 1:
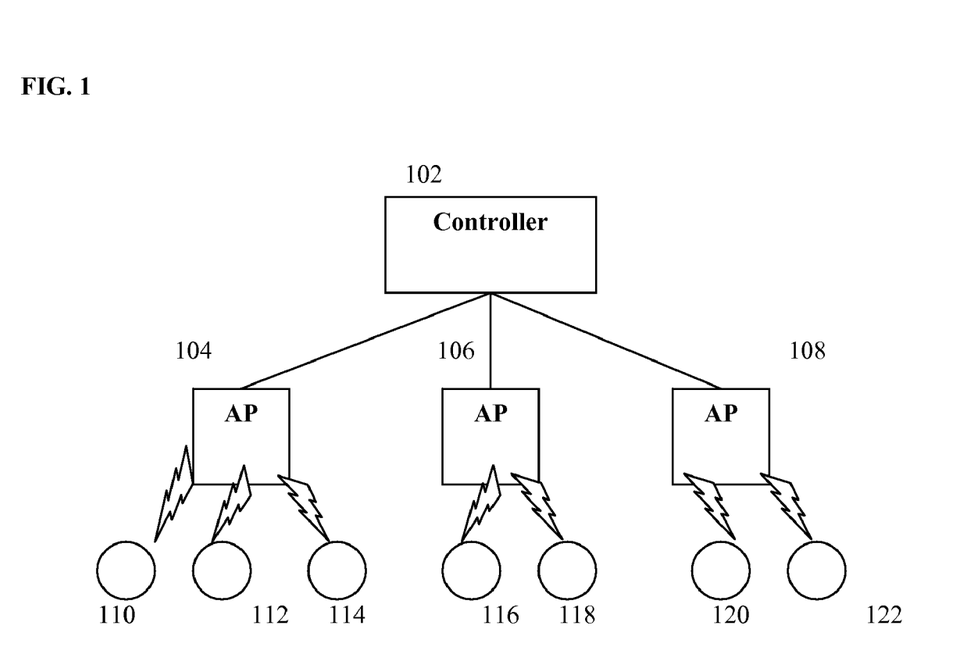
FIG. 1 illustrates an exemplary managed WLAN.

FIG. 1 illustrates an exemplary managed WLAN. As illustrated in FIG. 1, the WLAN included APs 104, 106, and 108, which provide wireless network access to clients 110, 112, 114, 116, 118, 120, and 122. A central controller 102 communicates with each of the APs 104, 106, and 108. The controller 102 can be communicate with to the APs 104, 106, and 108 wiredly or wirelessly, in order to transmit administrative instructions to the APs 104, 106, and 108. The APs 104, 106, and 108 independently schedule and transmit data packets to their respective clients 110, 112, 114, 116, 118, 120, and 122, using a wireless protocol, such as 802.11 a/g/b. The APs 104, 106, and 108 transmit data packets using a variety of channels. If the APs 104, 106, and 108 are in a certain interference range of each other, than only one of the APs 104, 106, and 108 can transmit at any instant over a certain channel. The clients 110, 112, 114, 116, 118, 120, and 122 can be devices, such as computers, cell phones, PDAs, etc. The APs can connect to the Internet through additional wired and wireless networks to provide Internet connectivity to the clients 110, 112, 114, 116, 118, 120, and 122.

Figure 2:
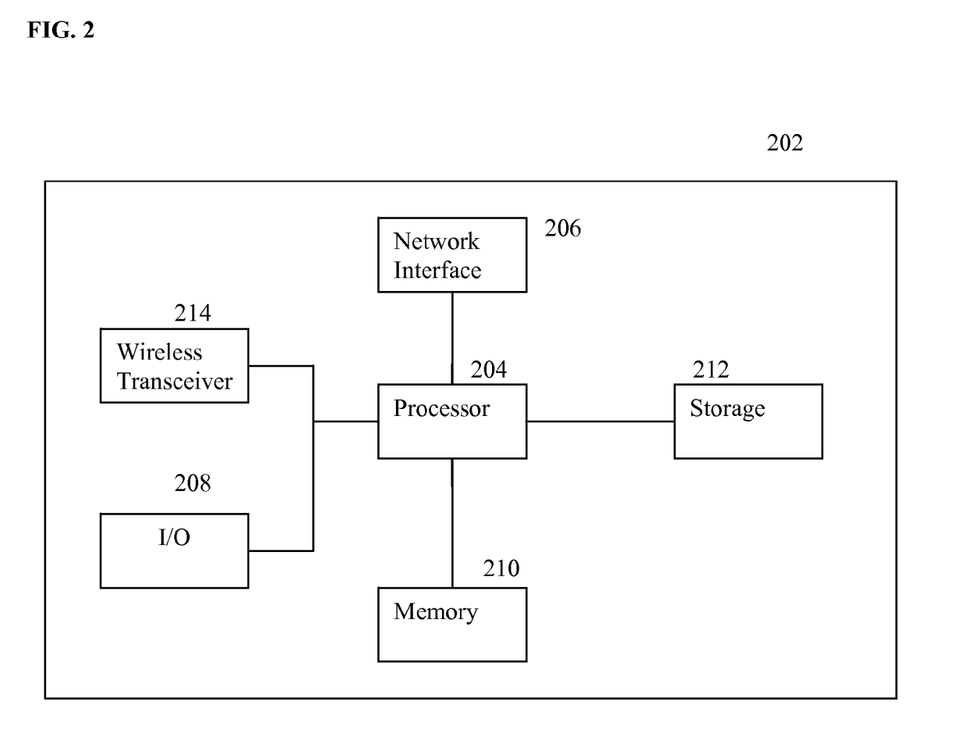
FIG. 2 is a high level block diagram of a computer capable of implementing the present invention.

The APs 104, 106, and 108 and the controller 102 of FIG. 1 can be implemented as computers using well-known computer processors, memory units, storage devices, computer software, and other components. Accordingly, per-client power management methods according to embodiments of the present invention can be implemented on such a computer. A high level block diagram of such a computer is illustrated in FIG. 2. Computer 202 contains a processor 204 which controls the overall operation of the computer 202 by executing computer program instructions which define such operation. The computer program instructions may be stored in a storage device 212 (e.g., magnetic disk) and loaded into memory 210 when execution of the computer program instructions is desired. Thus, all method steps described below for, including the method steps illustrated in FIG. 4, may be defined by the computer program instructions stored in the memory 210 and/or storage 212 and controlled by the processor 204 executing the computer program instructions. The computer 202 also includes one or more network interfaces 206 for communicating with other devices via a network. For example, an AP and a central controller may communicate with each other via network interfaces. The computer 202 may include a wireless transceiver 214 for transmitting and receiving data using a wireless protocol. For example, an AP can transmit data packets to clients and receive data packets from clients using a wireless transceiver 214. The computer 202 also includes other input/output devices 208 that enable user interaction with the computer 202 (e.g., display, keyboard, mouse, speakers, buttons, etc.) One skilled in the art will recognize that an implementation of an actual computer could contain other components as well, and that FIG. 2 is a high level representation of some of the components of such a computer for illustrative purposes.

Figure 3A:
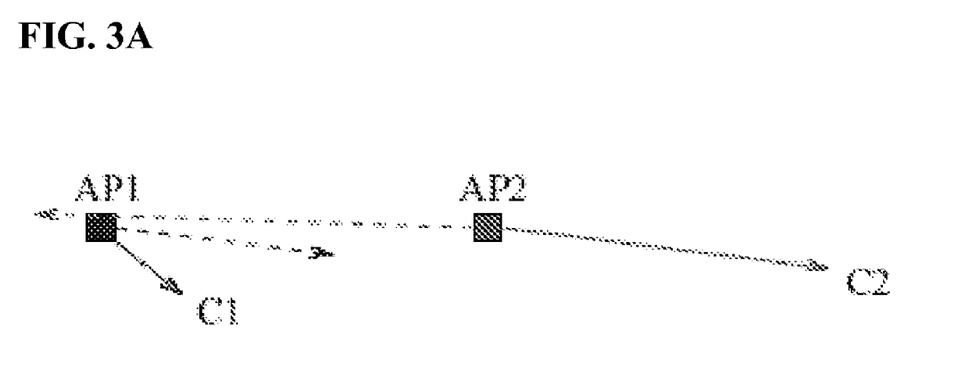
FIGS. 3A and 3B illustrate an asymmetric link problem and a hidden node problem, respectively.
Figure 3B:
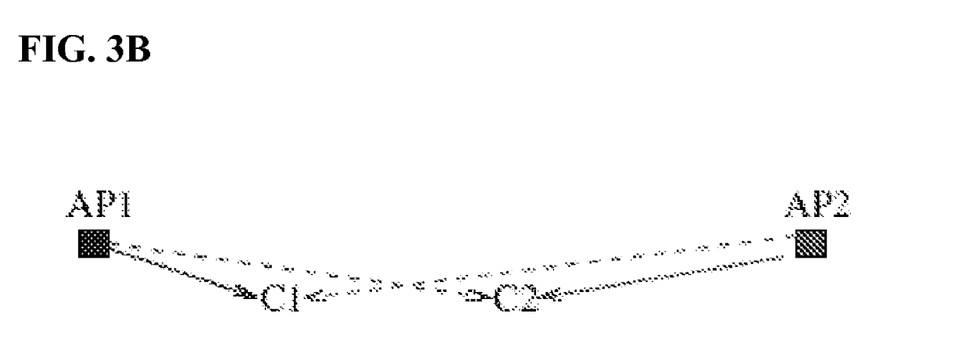

According to an embodiment of the present invention, an AP in a WLAN can transmit data packets at different power levels for different clients. However, when multiple APs vary power levels independently of each other, asymmetric links and increased hidden nodes can occur. FIGS. 3A and 3B illustrate an asymmetric link problem, and a hidden node problem, respectively. As illustrated in FIGS. 3A and 3B, AP1 and AP2 are access points and C1 and C2 are the respective clients of AP1 and AP2. In the asymmetric link problem of FIG. 3A, AP1 transmits at a lower power level than AP2. As illustrated by the dotted arrows, AP1 can sense AP2 transmissions, but AP2 cannot sense AP1 transmissions. In this situation, every time AP1 senses AP2's transmission for a certain channel, AP1 defers its own transmissions for the channel. As a result, AP1 may get few, if any, chances to transmit over the channel. Therefore, if both AP1 and AP2 have data to send over the same channel (for example, to C1 and C2), AP1's sending throughput reduces drastically, which can lead to starvation of the clients C1 of AP1. Accordingly, link asymmetry may lead to unfairness at an AP-level in terms of sending throughput.

In the hidden node problem of FIG. 3B, AP1 and AP2 cannot sense each other's transmissions. However, C1 can perceive packet transmissions from AP2, and C2 can perceive packet transmissions from AP1. In this case, since AP1 and AP2 cannot sense each other's transmissions, they may transmit data packets over the same channels, even though transmissions from AP1 interfere with the reception of transmissions from AP2 at C2 and transmissions from AP2 interfere with the reception of transmissions from AP1 at C1. Accordingly, this hidden node problem can degrade the delivery ratio of the clients C1 and C2. Delivery ratio can be defined as the ratio of number of packets successfully received at a receiver and number of packets sent by a transmitter.

Figure 4:
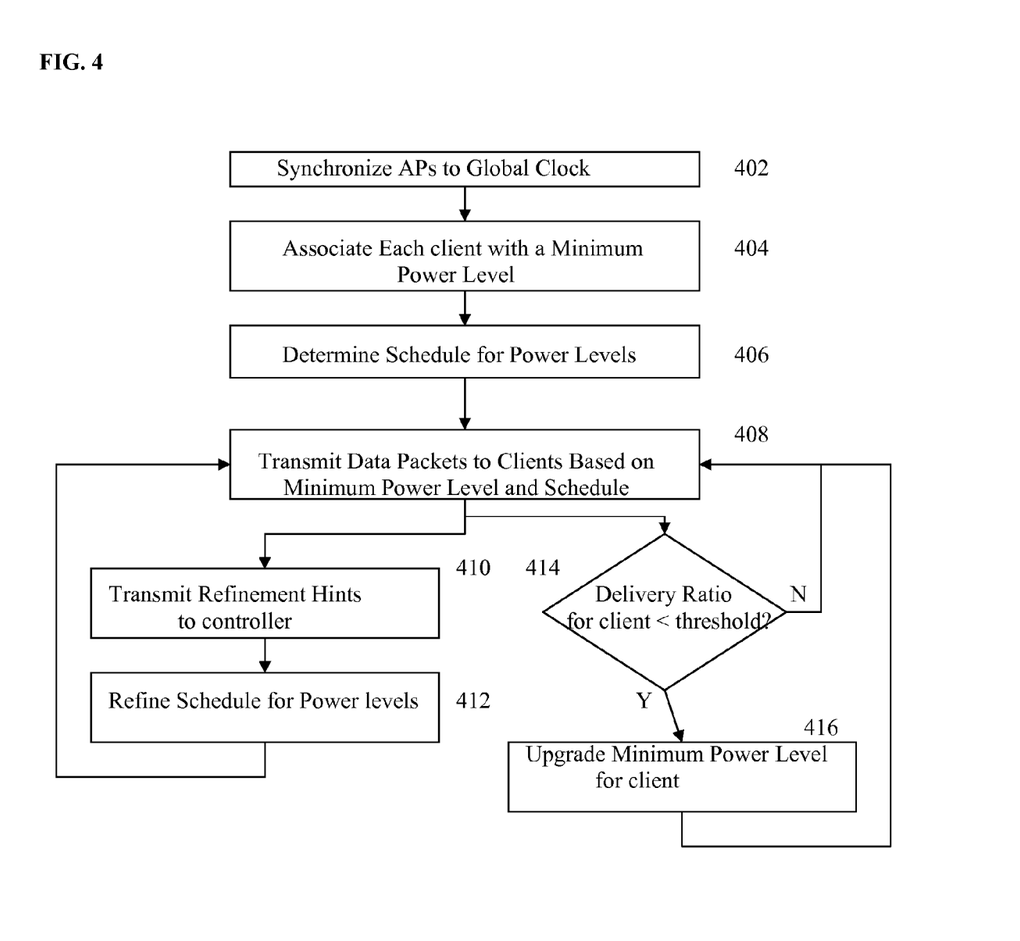
FIG. 4 illustrates a method for transmitting packets in a WLAN according to an embodiment of the present invention.

FIG. 4 illustrates a method for transmitting packets in a WLAN according to an embodiment of the present invention. The method of FIG. 4 improves spatial reuse by per client dynamic power management, without sacrificing fairness or delivery ratios from link asymmetry or increased hidden nodes. This method utilizes a slotted symmetric power control framework, which controls a group of APs to operate at the same power level at any given time and follow of sequence of power levels synchronously. Time is dived into slots, and in each slot, all access points operate at the same power level, thereby avoiding link asymmetry. By varying over different power levels, all APs can serve each client at a minimum power level associated with the client, thereby improving spatial reuse. The APs can include all APs in a WLAN or a group of APs within a WLAN.

As illustrated in FIG. 4, at step 402, all of the APs and the central controller are synchronized to a global clock. There are many well-known methods for synchronizing multiple devices to a global clock. According to an embodiment of the present invention, each AP and the central controller may have a global positioning system (GPS) receiver, and the APs and the central controller can synchronize their internal clocks to coordinated universal time (UTC) based on clock pulses provided by the GPS receivers.

Figure 5:
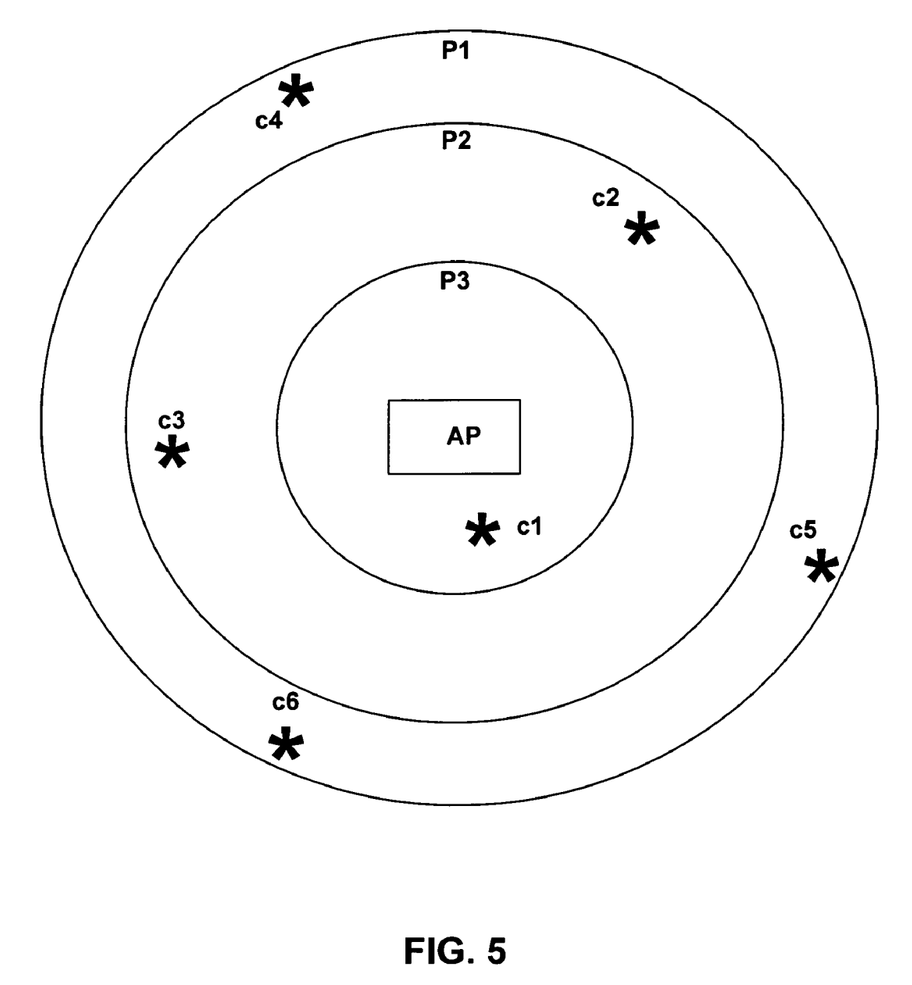
FIG. 5 illustrates mapping of clients to different power levels by an AP.

At step 404, at each AP, each client of the AP is associated with a minimum power level. Each AP maps each of its clients to a minimum power level at which the delivery ratio is greater than a threshold value. FIG. 5 illustrates associating clients to power levels for an AP, according to an embodiment of the present invention. As illustrated in FIG. 5, the AP maps each of its clients c1-c6 to one of three discrete power levels P1, P2, and P3. In order to map the clients c1-c6 to the power levels P1, P2, and P3, each client c1-c6 is mapped to the lowest one of the power levels P1, P2, and P3, for which the delivery ratio to the client C1-C6 is greater than a threshold. In FIG. 5, where P1>P2>P3, c1 is associated with the minimum power level P3, c2 and c3 are associated with the minimum power level P2, and c4, c5, and c6 are associated with the minimum power level P1. To estimate delivery ratio of each client without assistance from the client, each AP can gather statistics including number of retransmissions, number of packets dropped due to excessive retransmissions, and the total number of packets transmitted to each client. The delivery ratio can then be calculated as the ratio of the number of successful transmissions to the number of total transmissions.

Figure 6:
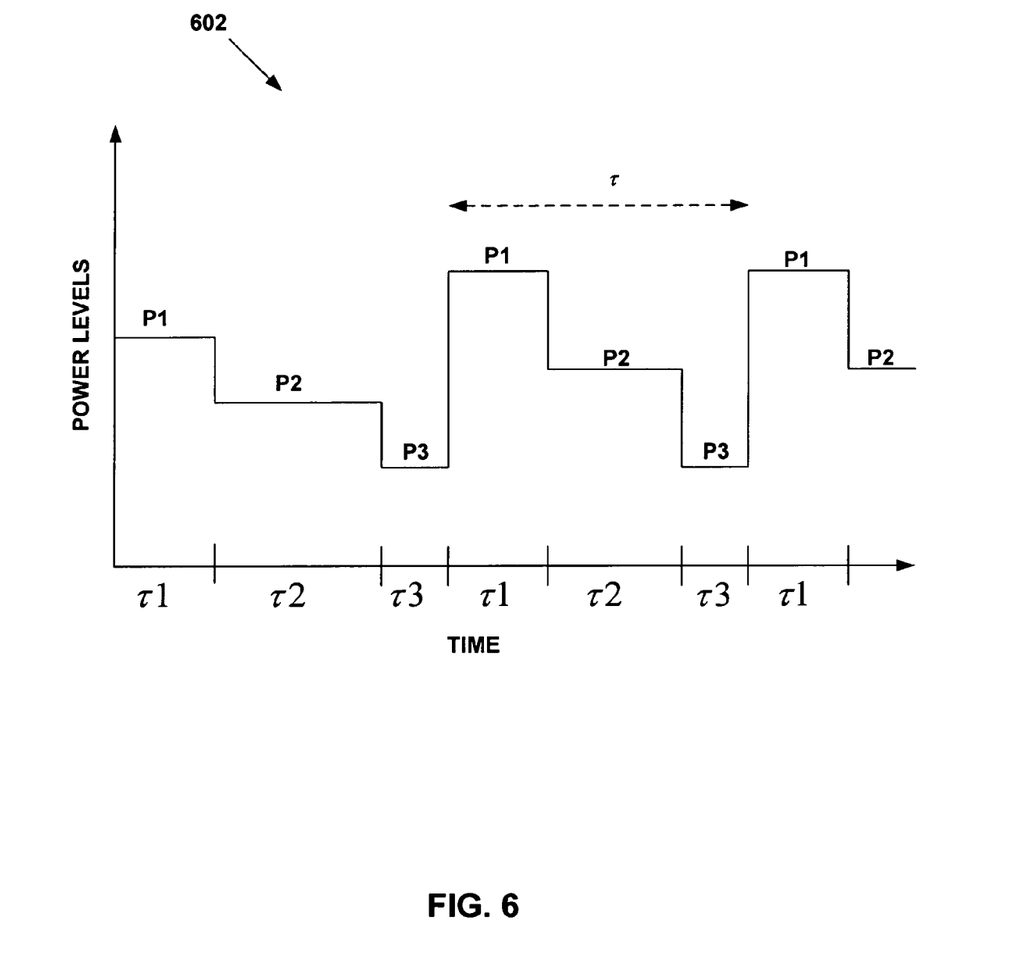
FIG. 6 illustrates an exemplary envelope for scheduling power levels, according to an embodiment of the present invention.

Returning to FIG. 4, at step 406, a schedule for the power levels is determined by the controller. The controller determines schedule for the APs to transmit at each of the discrete power levels associated with the clients. The controller generates an envelope of power levels and the time $\tau_k$ to spend transmitting at each power level $P_k$, and instructs each AP to begin following the envelope (schedule) at a specific realtime. FIG. 6 illustrates an exemplary envelope 602 for scheduling power levels, according to an embodiment of the present invention. As illustrated in FIG. 6, the envelope 602 can be generate as a sequence of tuples of the form [$(P_1, \tau_1)$, $(P_2, \tau_2), \ldots, (P_n, \tau_n)$], where $$\sum_{k=1}^{n} \tau_k = T.$$

T represents the period of the envelope 602. According to an embodiment of the present, the envelope can be generated with the times $\tau_k$ initially set to a default allocation of T/n, such that the amount of time scheduled for each power level is equal n the initial envelope.

Returning to FIG. 4, at step 408, each AP transmits data packets to clients based on the minimum power levels associated with the clients and the schedule determined by the controller. Each AP receives the envelope from the controller and begins following the envelope at the specified real-time. The APs transmit data packets at the scheduled power level specified by the envelope for the amount of time specified by the envelope. Since the APs are synchronized to the same global real-time clock, following the envelope ensures that at all APs transmit at the same power level at the same time, and switch between power levels at the same time. It is possible that the envelope is repeated by the APs until a new or refined envelope is received from the central controller.

Figure 7:
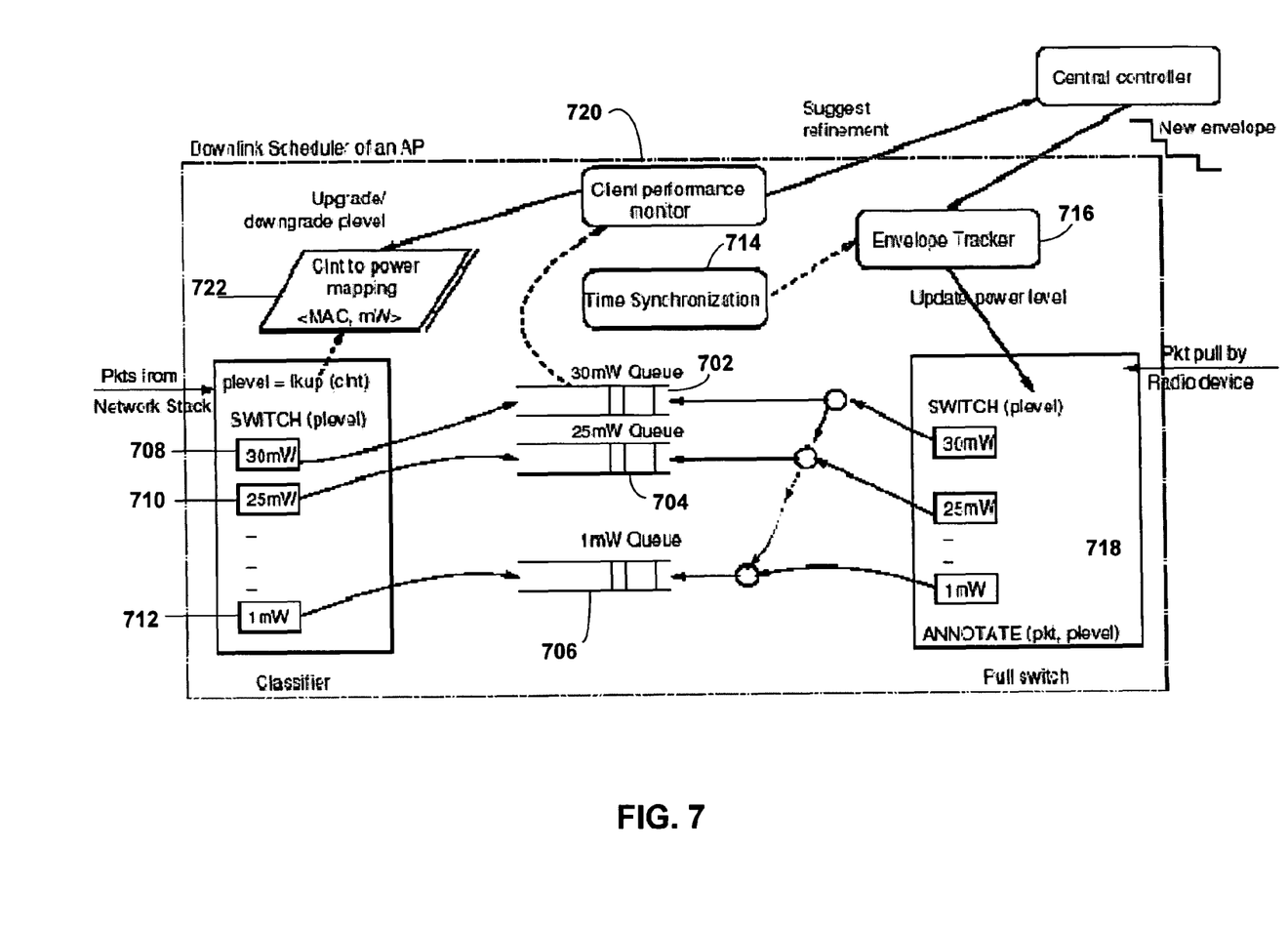
FIG. 7 illustrates an architecture used by an AP for scheduling data packet transmission according to an embodiment of the present invention.

FIG. 7 illustrates an architecture used by an AP for scheduling data packet transmission according to an embodiment of the present invention. As illustrated in FIG. 7, the architecture of FIG. 7 employs multiple queues 702, 704, and 706, each corresponding to one of the minimum power levels 708, 710, and 712. When a data packet arrives from the network stack, the AP identifies the minimum power level 708, 710, or 712 of the client for which the packet is destined and adds the data packet to the queue 702, 704, or 706 corresponding to the minimum power level 708, 710, or 712. The envelope provided by the central controller defines the transmission power levels to use at each instant of time. A time synchronization application 714 synchronizes the AP to a real-time global clock (step 14), and an envelope tracker 716 controls the AP to follow the envelope based on the real-time global clock. Based on the envelope, the envelope tracker 716 controls an allowed power level in a pull switch 718, which pulls data packets from the queues 702, 704, and 706. To transmit a data packet, an output device (i.e., radio transmitter) pulls a data packet through the pull switch 718 from the non-empty queue 702, 704, and 706 corresponding to the highest minimum power level 708, 710, and 712 that is equal to or less than the allowed level. Accordingly, data packets can be pulled from a queue 702, 704, and 706 corresponding to a minimum power level 708, 710, and 712 that is below the allowed level if the queue corresponding to the allowed level is empty. However, packets from a queue corresponding to a minimum power level below the allowed (scheduled) level are transmitted at the allowed (scheduled) level.

A client performance monitor 720 stores client performance data, such as delivery ratios, which is used to generate refinement hints which are transmitted to the central control (steps 410 and 412). The client performance data is also used by a client to power application 722 to map clients to the minimum power levels 708, 710, and 712 (step 402), and determine whether to upgrade a minimum power level of a client (step 414).

Returning to FIG. 4, according to an embodiment of the present invention, while the APs are transmitting data packets by following the power level schedule determine by the controller, steps 410 and 412 can be performed to refine the power level schedule, and steps 414 and 416 can be performed to upgrade minimum power levels of clients.

At step 410, refinement hints are transmitted from each AP to the central controller. Each AP determines refinement hints to adjust the envelope to better meet requirements of the AP's clients (including their position, traffic, etc.) referring again to FIG. 7, in order for an AP to determine the refinement hints, the performance monitor 720 can maintain an exponentially weighted moving average of arrival rate, $\lambda_i$, for each queue 702, 704, and 706. Based on this rate, the performance monitor 720 can periodically generate refinement hints such that the time spent at each level is proportional to the arrival rate at that level. Accordingly, the refinement hints can be generated as a sequence of tuples:

$$\left[\left(P_1, \frac{T}{n} \cdot \frac{\lambda_1}{\rho_1}\right), \left(P_2, \frac{T}{n} \cdot \frac{\lambda_2}{\rho_2}\right), \ldots, \left(P_n, \frac{T}{n} \cdot \frac{\lambda_n}{\rho_n}\right)\right]$$

where $\rho_i$ represents the maximum transmission rate at power level $P_i$, and T represents the period of the envelope. Each AP transmits the refinement hints indicating determined by that AP to the controller.

At step 412, the schedule for the power levels is refined by the controller based on the refinement hints received at the controller from each of the APs. In refining the envelope, the central controller first assigns a minimum time allocation to each power level. The controller can calculate the minimum time allocation for the APs to transmit at each power level as:

$$\tau_k = \text{MIN}\left[(\forall j \text{ MAX}(t_k^j)), \frac{T}{n}\right]$$

where $t_k^j$ represents the time $$\frac{T}{n} \cdot \frac{\lambda_k}{\rho_k}$$

at power level $P_k$ requested by AP j in the refinements hints. Once the controller has assigned a minimum allocation to each power level, the controller distributes the remaining time out of the period T among power levels that require more than the minimum allocation. Let $S = T - \Sigma_k \tau_k$ represent the total slack out of the period T, where $\Sigma_k \tau_k$ denotes the total time used up in allocating the minimum time for each power level. Further, let $D_k = (\forall j \text{ MAX}(t_k^j)) - \tau_k$ denote the deficit at each power level. The total slack can be distributed by iterating over the power levels with non-zero deficit and fulfilling the deficit of the highest power level in each iteration until all the residual slack is allocated, or there exists no more power levels with non-zero deficit. The remaining slack, if any can be distributed among all of the power levels proportional to their current allocation.

The controller sends the new (refined) envelope to each of the APs, with a new real-time far enough in the future that every AP received the new envelope before their clocks reach the real-time. Accordingly, the method returns to step 408, and at the specified real-time, each AP transmits data packets based on the refined schedule.

At step 414, for each AP, it is determined whether the delivery ratio for any client is less than a threshold. If the delivery ratio is not less than the threshold for any clients of an AP, the method returns to step 408, and the AP continues transmitting data packets based on the same minimum power levels. If the delivery ratio for a client is less than the threshold, the method proceeds to step 416.

At step 416, the AP upgrades the minimum power level for the client. The AP can monitor delivery ratios of its clients at regular intervals, and if the delivery ratio for a client falls below a certain threshold, the AP associates the client with the minimum power level that is one higher than the client's previous minimum power level. The method then returns to step 408, and the AP transmits data packets to the client based on the upgraded minimum power level for the client. According to a possible implementation, the client can then be downgraded to its default minimum power level at regular intervals to ensure that clients will not be permanently upgraded to higher power levels due to transient problems in delivery ratio.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmitting data packets from an access point in a wireless local area network to a plurality of clients, comprising:
   determining, for each of a plurality of clients, a delivery ratio corresponding to each of a plurality of minimum power levels;
   associating each client with a respective one of the plurality of minimum power levels by associating each client with a lowest one of said plurality of minimum power levels for which the delivery ratio for the client is greater than a threshold; and
   transmitting data packets, at each of a plurality of scheduled transmission power levels, to at least one client, wherein the respective one of the plurality of minimum power levels with which each of the at least one clients is associated is less than or equal to the scheduled transmission power level.

2. The method of claim 1, further comprising:
   synchronizing an internal clock of said access point to a global clock, wherein said plurality of scheduled transmission power levels are scheduled with respect to the global clock.

3. The method of claim 1, wherein said step of transmitting data packets comprises:
   assigning data packets to queues corresponding to the respective one of the plurality of minimum power levels associated with destination clients of the data packets; and
   transmitting, at the scheduled power level, the data packets from a non-empty one of the queues corresponding to a highest minimum power level equal to or less than the scheduled transmission power level.

4. The method of claim 1, wherein said step of transmitting data packets comprises:
   receiving a schedule specifying a sequence of said plurality of scheduled transmission power levels and an amount of time for transmitting at each of said plurality of scheduled transmission power levels;
   sequentially transmitting data packets, at each of said plurality of scheduled transmission power levels in the specified sequence for the amount of time specified for each scheduled transmission power level.

5. The method of claim 1, further comprising:
   generating refinement hints for adjusting a schedule of said scheduled power transmission levels; and
   transmitting said refinement hints to a central controller.

6. The method of claim 5, wherein said step of generating refinement hints comprises:
   calculating an arrival rate for each of said scheduled transmission power levels; and
   determining an adjusted time for each of said scheduled transmission power levels, such that the adjusted time for each of said scheduled transmission power levels is proportional to the arrival rate for the scheduled transmission power level.

7. The method of claim 1, further comprising:
   detecting when a delivery ratio of a client is less than a threshold; and
   when the delivery ratio of a client is less than the threshold, upgrading the minimum power level associated with the client to a next highest one of said plurality of minimum power levels.

8. A method for transmitting data packets from a plurality of access points in a wireless local area network to clients of each of said plurality of access points, comprising:
   determining, for each of a plurality of clients of said plurality of access points, a delivery ratio corresponding to each of a plurality of minimum power levels;
   for each of said plurality of access points, associating each client with a respective one of said plurality of minimum power levels by associating each client with a lowest one of said plurality of minimum power levels for which the delivery ratio for the client is greater than a threshold;
   generating a global schedule for transmission at each of a plurality of transmission power levels for a corresponding transmission time; and
   transmitting from each of said access points, at each of said plurality of transmission power levels for the corresponding transmission time according to said global schedule, data packets to at least one client, wherein the respective one of the plurality of minimum power levels with which each of the at least one clients is associated is less than or equal to the transmission power level.

9. The method of claim 8, further comprising:
   synchronizing each of said access points to a global clock, wherein said global schedule is followed simultaneously by each of said access points based on said global clock.

10. The method of claim 8, further comprising:
    for each of said plurality of access points, generating refinement hints for adjusting said global schedule based on performance data for the access point; and
    refining said global schedule based on said refinement hints for all of said plurality of access points.

11. The method of claim 10, wherein said step of generating refinement hints comprises for each of said plurality of access points:
    calculating an arrival rate for each of said transmission power levels; and
    determining an adjusted time for each of said transmission power levels, such that the adjusted time for each of said transmission power levels is proportional to the arrival rate for the transmission power level.

12. The method of claim 10, wherein said step of refining said global schedule comprises:
    calculating minimum time allocation for each of said plurality of transmission power levels based on said refinement hints; and
    distributing remaining time among transmission power levels that require more than the minimum allocation based on said refinement hints.

13. The method of claim 8, further comprising:
    for each of said plurality of access points, detecting when a delivery ratio of a client is less than a threshold; and
    when the delivery ratio of a client is less than the threshold, upgrading the minimum power level associated with the client to a next highest one of said plurality of minimum power levels.

14. An access point for transmitting data packets to a plurality of clients in a wireless local area network, comprising:

means for determining, for each of a plurality of clients, a delivery ratio corresponding to each of a plurality of minimum power levels;

means for associating each client with a respective one of a plurality of minimum power levels by associating each client with a lowest one of said plurality of minimum power levels for which the delivery ratio for the client is greater than a threshold; and means for transmitting data packets, at each of a plurality of scheduled transmission power levels, to at least one client, wherein the respective one of the plurality of minimum power levels with which each of the at least one clients is associated is less than or equal to the scheduled transmission power level.

15. The access point of claim 14, further comprising:

means for synchronizing an internal clock to a global clock, wherein said plurality of scheduled transmission power levels are scheduled with respect to the global clock.

16. The access point of claim 14, wherein said means for transmitting data packets comprises:

a plurality of queues, each corresponding to one of the plurality of minimum power levels for storing data packets destined for clients associated with said one of the plurality of minimum power levels; and a wireless transmitter for transmitting, at the scheduled transmission power level, the data packets from a non-empty one of the queues corresponding to highest minimum power level equal to or less than the scheduled transmission power level.

17. The access point of claim 14, further comprising:

means for generating refinement hints for adjusting a schedule of said scheduled transmission power levels; and means for transmitting said refinement hints to a central controller.

18. The access point of claim 14, further comprising:

means for detecting when a delivery ratio of a client is less than a threshold; and means for upgrading the minimum power level associated with a client to a next highest one of said plurality of minimum power levels when the delivery ratio of the client is less than the threshold.

19. A system for transmitting data packets to a plurality of clients in a wireless local area network, comprising:

a central controller configured to generate a global schedule for transmission at each of a plurality of transmission power levels for a corresponding transmission time; and a plurality of access points configured to determine, for each of a plurality of clients, a delivery ratio corresponding to each of a plurality of minimum power levels, each access point configured to associate each of a plurality of clients with a respective one of a plurality of minimum power levels, by associating each client with a lowest one of said plurality of minimum power levels for which the delivery ratio for the client is greater than a threshold, and each access point configured to transmit, at each of said plurality of transmission power levels for the corresponding transmission time according to said global schedule, data packets to at least one client, wherein the respective one of the plurality of minimum power levels with which each of the at least one clients is associated is less than or equal to the scheduled transmission power level.

20. The system of claim 19, wherein each of said plurality of access points is synchronized to a global clock.

21. The system of claim 19, wherein:

each of said plurality of access point is configured to generate refinement hints for adjusting said global schedule based on performance data for the access point, and transmit said refinement hints to said central controller; and said central controller is configured to receive said refinement hints from each of said access points, and refine said global schedule based on said refinement hints.

22. The system of claim 19, wherein:

each of said plurality of access points is configured to detect when a delivery ratio of a client is less than a threshold, and upgrade the minimum power level associated with a client to a next highest one of said plurality of minimum power levels when the delivery ratio of the client is less than the threshold.

* * * * *